United States Patent [19]

Lee

[11] Patent Number: 4,616,439
[45] Date of Patent: Oct. 14, 1986

[54] AUTOMATIC FISH HOOK

[76] Inventor: Jong J. Lee, 4377 Los Angeles Ave., Somis, Calif. 93021

[21] Appl. No.: 627,342

[22] Filed: Jul. 2, 1984

[51] Int. Cl.[4] ............................................. A01K 83/02
[52] U.S. Cl. ...................................................... 43/36
[58] Field of Search .................... 43/36, 34, 35, 37, 89

[56] References Cited

U.S. PATENT DOCUMENTS

| 627,015 | 6/1899 | Schlaebitz | 43/89 |
|---|---|---|---|
| 1,814,037 | 7/1931 | Hazen | 43/5 |
| 2,644,264 | 7/1953 | Heki | 43/36 |
| 2,897,624 | 8/1959 | Yakel | 43/36 |
| 3,803,748 | 4/1974 | Neal | 43/36 |

Primary Examiner—Gene P. Crosby

[57] ABSTRACT

A fish hook having two hooks which are movably secured together to move in a scissors like fashion, a spring portion that can forcibly seperate the point and barb parts of the two hooks, and a trigger safety adaptation is disclosed. The two hooks are brought together parallel to each other then the spring portion is flexed to form an acute angle with the two hooks. In this position the two hooks will not seperate unless a force is introduced to change the angle of the spring portion and the two hooks. During fishing the force will be supplied by the fish biting and slightly tugging the bait. Once the fish hook is activated the two hooks forcibly seperate thereby catching the fish. The double hook design practically eliminates the chance of the fish getting loose by vigorous movements. To eliminate the chance of the fish hook being activated by the vigorous motion of casting and hitting the water surface a safety adaptation is devised. Placement of a water soluble tablet in the adaptation prevents unwanted activation of the fish hook. In the water the water soluble tablet dissolves thereby rendering the fish hook ready to be activated.

1 Claim, 7 Drawing Figures

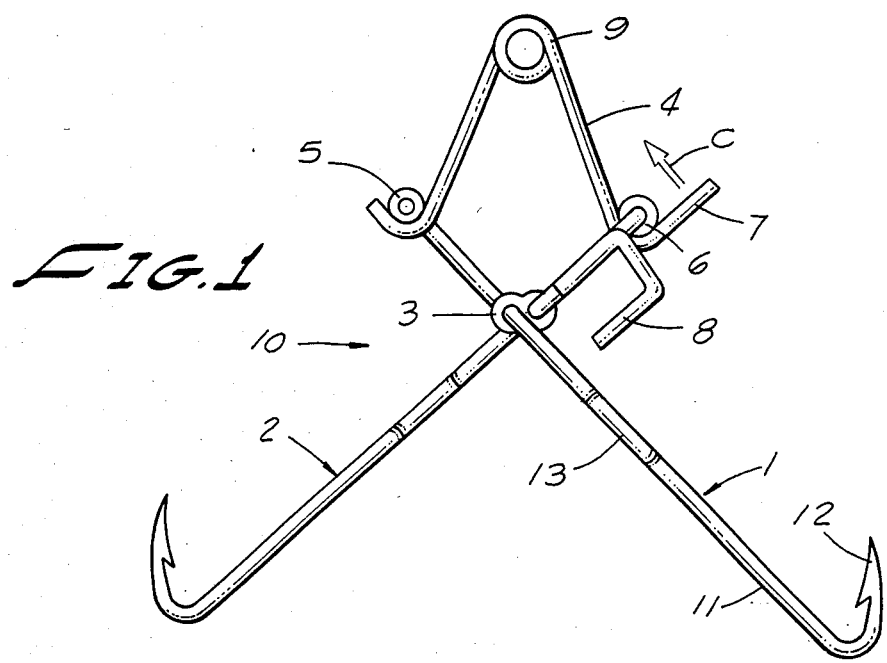
FIG.1
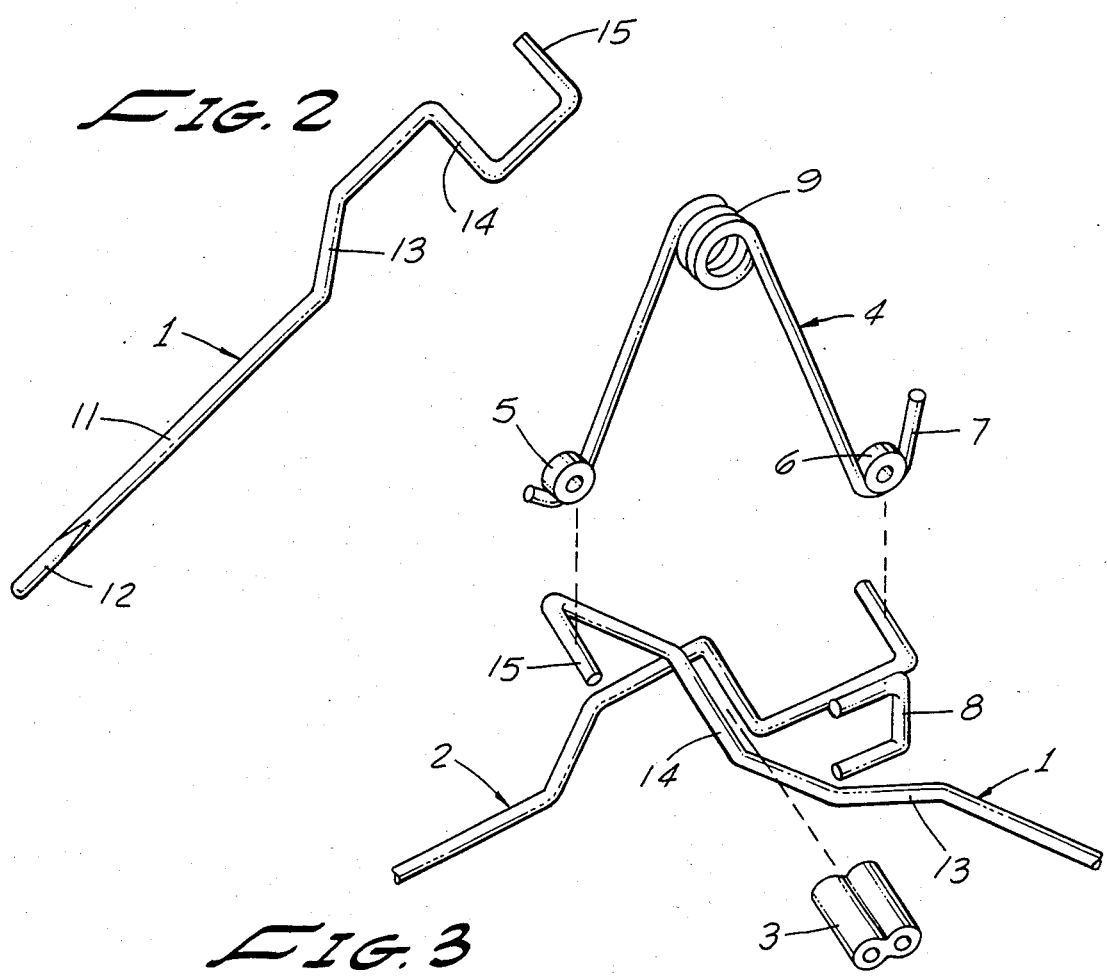
FIG.2
FIG.3

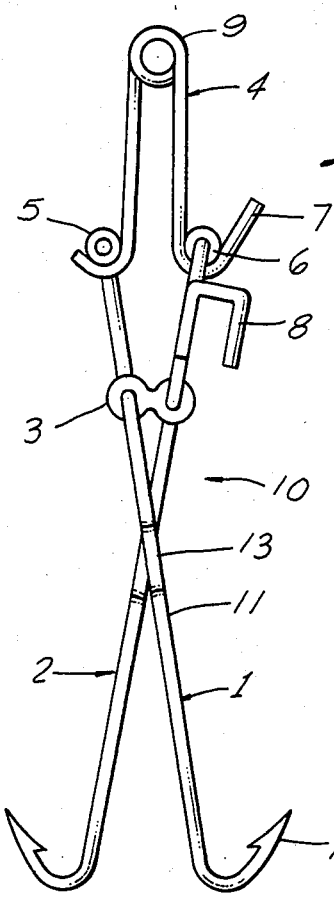
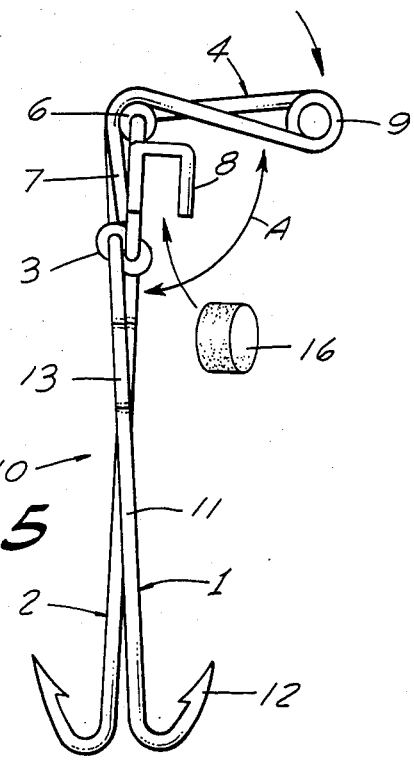
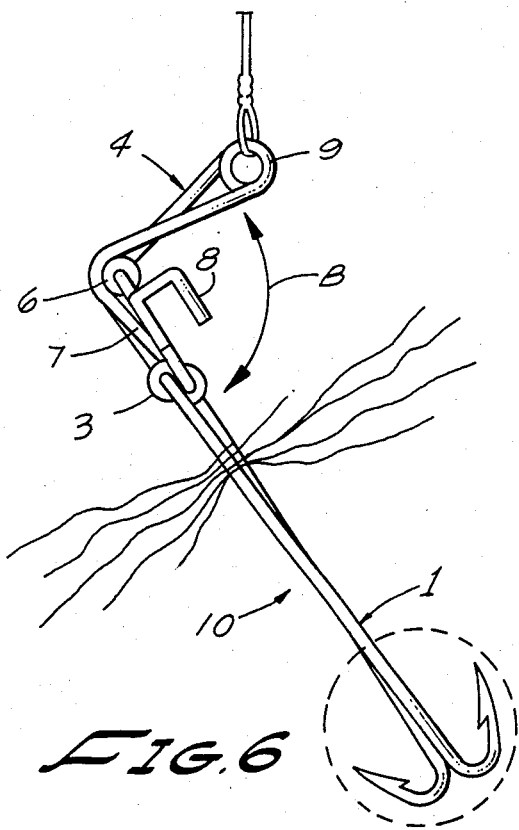
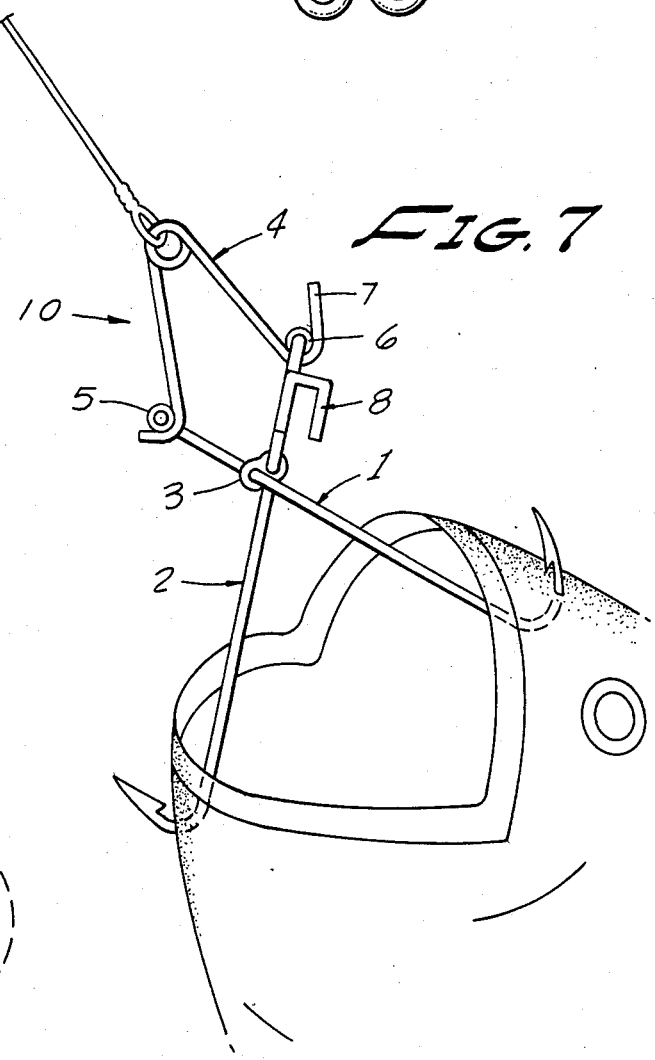

AUTOMATIC FISH HOOK

BACKGROUND OF THE INVENTION

1. Field of the Invention

This invention relates to a fishhook and more particularly to a fishhook with improved catching means. The fishhook of this invention mainly consists of two opposing hooks and a spring portion that can forcibly open up the two hooks when the fishhook is activated.

2. The Prior Art

Most conventional fishhooks are efficient to some degree but leaves much to be desires for. For instance, many fishermen loose bait frequently without catching any fish because of inedequate or untimely snatching of the hook. And even if one manages to catch one, vigorous movements of the fish can often set itself free.

The present invention solves these problems by providing two hooks that spread apart rapidly when the fish tugs at the bait, thereby securely engaging the mouth of the fish without having to snatch the fishhook. Once the hook is engaged in the mouth of the fish the chance of the fish getting away is practically eliminated due to the fishhook's double hook design that forcibly engages the mouth of the fish at two opposing places instead of just one.

Since there is no need for the fisherman to snatch the automatic hook which may be referred to as an autohook he can operate multiple autohooks with efficiency. This invention is also a cost effective alternative to the more bulky automatic hookers that work on the fishing pole.

SUMMARY OF THE INVENTION

A major objective of this invention is to provide an improved fishhook with which a more efficient fishing is possible. The double hook and spring design eliminates the need for snatching the fishhook and also greatly diminishes the chance of the fish setting itself loose by vigorous movements.

BRIEF DESCRIPTION OF THE DRAWINGS

FIG. 1 is an elevational side view of the Autohook.

FIG. 2 is an elevational view of one of the two hooks of the Autohook with the barb and point pointing toward the viewer.

FIG. 3 is an exploded perspective view of the Autohook.

FIG. 4 is an elevational side view of the Autohook with the two hooks brought together.

FIG. 5 is an elevational side view of the Autohook with the two hooks brought together and the spring portion flexed into position.

FIG. 6 is an elevational side view of the Autohook with bait and a camouflaging mean in water.

FIG. 7 is a view of the Autohook engaged in the mouth of a fish.

DETAILED DESCRIPTION OF THE PREFERRED EMBODIMENT

Referring now more particularly to the drawings, the Autohook according to this invention is illustrated by general reference number 10 as comprising of two hooks 1 and 2, a joint piece 3 that holds the two hooks 1 and 2 and allows a scissors type motion, a spring piece 4 that articulates with hooks 1 and 2 through the hole pieces 5 and 6, an extension 7 of the spring piece 4, and part 8 that is attached to the hook 2.

Now referring to FIG. 2, hook 1 has a shaft 11, point and barb 12, portion 13 which allows the shaft 11 of hook 1 to in the same plane as the corresponding shaft of hook 2, portion 14 which articulates with the joint piece 3, and portion 15 which articulates with hole piece 5. Hook 2 is identical with hook 1 in every aspect.

MODE OF OPERATION

Referring to the drawings the working mechanism of the Autohook will now be elucidated. FIG. 1 shows the Autohook with hooks 1 and 2 spread apart by the action of the spring 4. This is the position of the Autohook ater activation. To set the Autohook the hook 1 and 2 are brought close to each other as in FIG. 4. In this position the hole pieces 5 and 6 are in close proximity to each other which allows the spring portion 4 to be flexed as in FIG. 5. The spring portion 4 is flexed to a position where part 7 is in contact with joint piece 3. As long as the angle A is less than 90 degrees the Autohook will stay in this configuration by itself. When an outside force changes the angle A so that it becomes greater than 90 degrees the force of spring 4 will cause the hooks 1 and 2 to spread apart forcibly and the Autohook will assume the position of FIG. 1.

Referring now to FIG. 5 the safety mechanism of the Autohook will be explained. When the Autohook is in the flexed position as in FIG. 5 a space is formed between the part 8 and part 7. As long as these two parts 7 and 8 are kept from proximating each other the Autohook will not activate no matter how much force is introduced to it since the spring 4 will not be able to "unflex" and activated the Autohook. To prevent parts 7 and 8 from proximating a water soluble tablet 16 of appropriate size and substance is fitted between the two parts 7 and 8. The tablet 16 prevents accidental activation of the Autohook during handling and casting the Autohook. When the Autohook is in contact with water the tablet will dissolve away and render the Autohook ready to be activated by unsuspecting fishes. FIG. 6 shows the position of the baited Autohook in water with the tablet 16 dissolved away. In this position the Autohook is ready to be activated by any force in the direction of B that is great enough to increase the angle A to a degree greater than 90.

The sensitivity of the Autohook can be controlled by controlling the angle A. As the angle A approaches 90 degrees the Autohook becomes more sensitive because less force is needed to cause angle A to become greater than 90 degrees. Angle A can be controlled by manipulating part 7. As an example, if part 7 is bent in the direction of the arrow C of FIG. 1, the angle A will be proportionately less in the flexed position of FIG. 5.

Although a certain specific embodiment of the invention has been shown and described, it is obvious that many modifications thereof are possible. The invention, therefore is not intended to be restricted to the exact showing of the drawings and descriptions thereof but is considered to include reasonable and obvious equivalents.

What is claimed is:

1. A fishhook comprising of two hooks, each having a shaft and movably joined together at the shaft to allow a scissors type motion with the points of the said hooks pointing away from each other, a spring having two extensions, connecting means for movably attaching respective ends of the extensions to said shafts to allow the force of the spring to forcibly spread apart the said two hooks, and said connection means allowing said spring member to be flexed, after the said two hooks are brought together, to a new position roughly perpendicular to the said two hooks, said fishhook holding said spring in said perpendicular configuration until an outside force is introduced which will unflex said spring member and cause the said two hooks to forcibly spread apart away from each other.

* * * * *